United States Patent [19]

Kilroy

[11] Patent Number: 4,680,194
[45] Date of Patent: Jul. 14, 1987

[54] PROCESS OF PREPARING FOOD PRODUCTS

[75] Inventor: Stanley A. R. Kilroy, Donvale, Australia

[73] Assignee: Alpen Dairy Foods Pty. Limited, Donvale, Australia

[21] Appl. No.: 794,437

[22] Filed: Nov. 4, 1985

Related U.S. Application Data

[63] Continuation-in-part of Ser. No. 513,968, filed as PCT AU 82/00183, Nov. 11, 1982, published as WO 83/01728, May 26, 1983, Pat. No. 4,551,346.

[30] Foreign Application Priority Data

Nov. 11, 1981 [AU] Australia .................... PF1515

[51] Int. Cl.$^4$ .............................................. A23D 3/02
[52] U.S. Cl. .................................. 426/602; 426/603; 426/613
[58] Field of Search ............... 426/582, 585, 602, 603, 426/604, 613

[56] References Cited

U.S. PATENT DOCUMENTS

| | | | |
|---|---|---|---|
| 3,922,376 | 11/1975 | Strinning et al. | 426/603 |
| 3,946,122 | 3/1976 | Scharp | 426/604 |
| 4,000,332 | 12/1976 | Strinning et al. | 426/603 |
| 4,071,634 | 1/1978 | Wilton et al. | 426/604 |
| 4,390,560 | 6/1983 | Koide et al. | 426/585 X |
| 4,397,926 | 8/1983 | Galal et al. | 426/582 |

FOREIGN PATENT DOCUMENTS

| | | |
|---|---|---|
| B1-16162 | 1/1978 | Australia . |
| B1-19346 | 8/1979 | Australia . |
| B1-33642 | 5/1981 | Australia . |
| 1074176 | 3/1980 | Canada . |
| 2245814 | 4/1974 | Fed. Rep. of Germany . |
| WO83/01728 | 5/1983 | PCT Int'l Appl. . |

OTHER PUBLICATIONS

Meyer, Processed Cheese Manufacture, Food Trade Press Ltd., London, 1970, p. 56.
Wagner et al., Milchwissenschaft, 36, (12), 1981, pp. 744–747 and translation.

*Primary Examiner*—Robert Yoncoskie
*Attorney, Agent, or Firm*—Finnegan, Henderson, Farabow, Garrett & Dunner

[57] ABSTRACT

A process of preparing an emulsified food product comprises preparing an aqueous phase of proteinaceous milk solids, an aqueous carrier and an amount of peptizing agent which is effective to peptize the precipitated protein in the milk solids on heating and agitating. An edible fat is mixed with the sol so produced to form an oil-in-water emulsion which is then cooled to below 5° C. to convert the emulsion to one of the water-in-oil type by phase inversion. The product may be spreadable from the refrigerator on, if a large amount of protein has been included, may be in the form of a firm but sliceable product. If the emulsion has included non-precipitated protein, the product on being removed from the refrigerator may be unstable but can be stabilized by the addition of further amounts of peptizing agent and heating and agitating to produce a new oil-in-water emulsion which should then also be chilled to below 5° C. to invert the phase.

4 Claims, 1 Drawing Figure

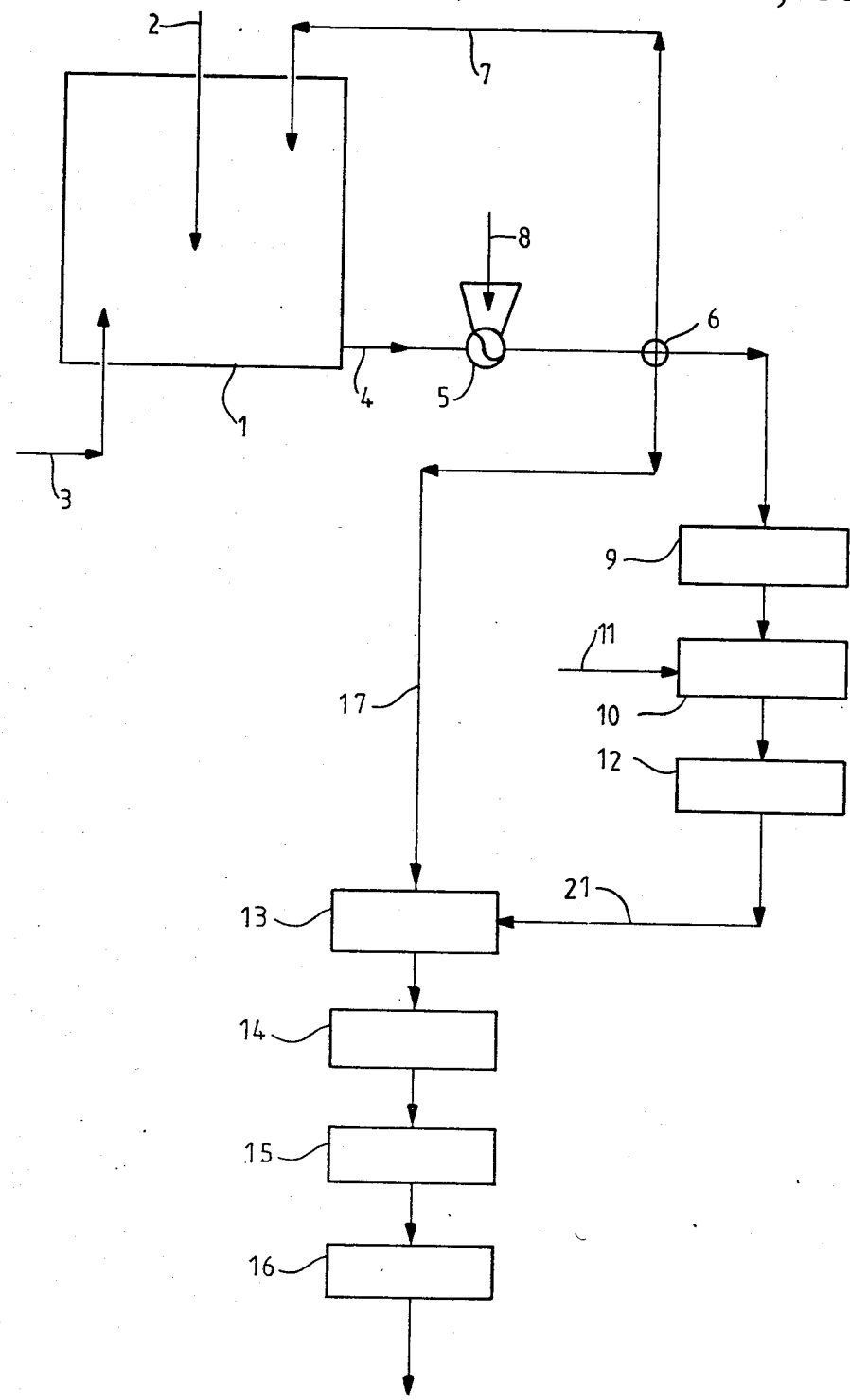

PROCESS OF PREPARING FOOD PRODUCTS

This application is a continuation-in-part of application Ser. No. 513,968 filed June 30th, 1983 as the national phase of International Application Ser. No. PCT/AU82/00183 filed Nov. 10th, 1982. Application Ser. No. 513,968 is now U.S. Pat. No. 4,551,346 issued Nov. 5, 1985.

The present invention relates to food products in which oils and fats form a substantial component and more particularly is concerned with emulsions comprising edible oil or fat, substantially entire precipitated proteins as the entire or non-fat solid matter, an emulsifying system and an aqueous carrier.

Emulsions produced by this invention may be manipulated in their formulation to yield spreads which may be flavoured, a spread identical to butter in appearance, taste and mouthfeel but without any need for vegetable or chemical stabilisers, as well as emulsions having sliceable characteristics. The spreads emanating from the application of this invention are most notable for their ability to be spread at refrigeration temperatures while the sliceable products have the desirable characteristics of water-in-oil (w/o) emulsions.

Cheese is a milk product comprising a solid mass of protein and butter fat of infinite variety and is well known throughout the world. It results from the precipitation from milk of protein with retained butter fat which is entrapped during the formation of the curd. Cheese curd produced in divers ways is usually compacted and stored.

Cheese, either green curd or matured, is commonly transformed by a process including heat treatment into a second product, processed cheese, to impart additional culinary and keeping qualities. It has been observed that processed cheese can be manipulated by the selection of raw material and emulsifiers into spreads which retain their spreading characteristics at low (0°–5° C.) temperatures as well as into sliceable masses which are essentially w/o emulsions. Processed cheese retains a highly desirable plasticity at low temperatures even when containing high proportions of butter fat.

The nature of processed cheese is such that it will always have the flavour of the cheese from which it is derived, which may not always be acceptable to the palate, while the mouthfeel of the gel is desirable and readily accepted as well as being highly convenient in the case of processed cheese spreads.

Butter is commonly manufactured in most developed countries and is traditionally employed as a spread. However, butter firms and hardens at a temperature below 15° C. and has such a low coefficient of heat transfer as to be slow to soften at higher ambient temperatures. Deliberate heating creates other problems due to separation of the constituents and an unattractive oily appearance, and for these and other reasons butter products can be difficult to handle at temperatures above approximately 30° C. The flavour of butter is generally considered to be its most desirable feature although it also has a unique texture and colour which are not natural facets of margarine. Margarine, which originated as a low cost imitation of butter utilizing less costly and more readily available oils and fats as alternatives to butter fat, has become very popular due to its cold spreading characteristic. The proliferation of household refrigerators which enable perishable foods such as butter to be held for longer periods at approximately 5° C. has therefore acted against the interests of butter manufacturers and has seriously impaired the acceptance of butter for spreading purposes.

Both butter and margarine are w/o emulsions. Dairy butter is manufactured by churning from cream which has been cultured or neutralised following souring. Traditionally, butter contains approximately 80% butter fat, approximately 16% moisture and a small percentage (1 to 2%) of curd which is milk solid matter carried forward from the milk.

Butter has a continuous fat phase consisting of fat globules which have been forced together during churning and an aqueous phase which consists primarily of small discrete droplets of water, but a small amount of water in butter exists in the form of minute continuous channels. The susceptability of butter to microbial spoilage appears to be closely related to the proportion of water that is present in these continuous channels.

Unlike cheese, it has never been possible to heat treat butter other than to break the emulsion, and therefore its moisture content of necessity has been restricted as has its useful life. Margarine being an imitation of dairy butter has the same restrictions in processing and usable life, although anti-oxidants are permitted to preserve the fats or oils employed.

The desirable features, described above, of its structure and its manipulation invest in cheese, highly sought after properties. As an example, cheddar cheese has approximately 63% of solid matter of which 50% is butter fat, the balance of 37% being protein. Cheddar cheese can be processed into an unlimited variety of desirable spreadable and sliceable emulsions which have included in them additional moisture. However, it will be appreciated that cheese processing is not an exact science and the proportions of components as well as the processing temperatures are often varied to obtain identical products.

The majority of cheese protein is casein precipitated by the generation of selected bacteria. The casein so formed has large net like aggregates which are peptised during processing using emulsifiers. Adjustments to the pH and creaming strength of the emulsifiers used during processing result in the production of short or long structured products which enable them to be spread or sliced respectively. In either case it is commonly accepted to be the effect of the emulsifiers on the precipitated casein that affects these structures.

The small fraction of non-fat solids in butter has been found to be insufficient to support emulsions such as those in processed cheese so that simple processing of butter to make it spreadable or sliceable at refrigeration temperatures has not been possible. While the small fraction of non-fat solids present in butter is not protein that has been precipitated, the curd does carry the entire flavour of butter. Casein, the principal protein of milk, can be precipitated directly by acid and heat, but when precipitated rapidly degrades, can have undesirable flavours and cannot be rehydrated. It can however be combined with sodium, calcium, potassium and other compounds to convert it to caseinate, in which form it can be dried and stored for long periods and rehydrated as required while still retaining the essential characteristics of casein as a protein.

The emulsifiers employed in processing cheese have also been found to be effective in processing caseinates by peptising them. Such emulsifiers are commonly citrates (the salts of citric acid) and polyphosphates (the salts of polyphosphoric acid). These salts can be employed in food processing to buffer the pH of emulsions, but their employment in the processing of cheese is more pronounced in their ability to peptise casein, and buffering is supplemental.

Wagner and Wagner Hering have reported on a further well known aspect of such salts in Milchwissenschaft 36 (12) 1981 which discusses the restricted ability of citrates in comparison to polyphosphates to affect the protein binding ability of the entire processed cheese mass so that the creaming process does not reach its optimal condition.

This creaming phenomenon is a further desirable characteristic of processed cheese, particularly spreads, which imparts a temperature stable gel, naturally.

The importance of temperature to the processing of protein by peptising salts such as phosphates and citrates has also been extensively reported upon by Meyer (Meyer A. JOHA Schmelzkaesebuch Ludwigshafen/-Rhein 1970) in which is stated "a minimum temperature of 65°–70° C. is desirable for processing. Should the temperature be raised, the production of casein sol is intensified". Meyer also states "whereas a processed cheese can be held at 75° C. for 15 mins without noteworthy change in structure and consistency, at 145° C. the time must be reduced to only a few seconds if a detrimental influence on the finished product is to be avoided".

It is a primary object of the present invention to employ the known technology of cheese processing with regard to its effect on protein to emulsify fats and oils generally. However fats and oils do not behave in emulsions of protein in the same manner as when such protein is incorporated with cheese. Butter as an emulsion also behaves differently to oils and fats alone when employed in a similar manner.

According to the present invention there is provided a method of producing a food product containing an edible fat which comprises the steps of:

(a) preparing an aqueous phase comprising proteinaceous milk solids, containing precipitated proteins an aqueous carrier and an effective amount of peptising agent, (b) agitating and heating the aqueous phase to a temperature and for a time both effective to complete the action of the peptising agent on the precipitated proteins in the milk solids and thereby produce a sol, (c) homogeneously mixing with the sol an edible fat to produce an oil-in-water emulsion, (d) cooling the emulsion to a temperature below 5° C. at which phase inversion occurs to a water-in-oil emulsion.

Proteinaceous milk solids may be added in varying amounts according to whether it is desired to have a spreadable or a sliceable product, as is known from processed cheese technology.

There have been many proposals for reduced-fat emulsions having butter-like properties, particularly texture, and which may be spread at refrigeration temperatures. However, none of these have been known to produce a protein sol to which a fat is added to form an oil-in-water emulsion whose phase is inverted by the simple expedient of chilling to provide the water-in-oil emulsion.

In particular, it is noted that in Australian Patent Specification No. 502,963 it is a primary object of the invention to avoid any phase inversion and the emulsion of that process is always of the water-in-oil type. Likewise, in U.S. Pat. No. 3,922,376 to Strinning et al. an aqueous phase and a fat phase are added at a temperature of 38° to 50° C. to produce a water-in-oil emulsion (see column 3 line 54). After mixing and flash pasteurization the emulsion is cooled in two steps, firstly to solidify the emulsion at 20°–14° C. when the emulsion is mechanically worked to disperse the water phase droplets and secondly to a storage temperature of 12°–8° C. (see column 4 lines 7 to 16) with the resultant product remaining a water-in-oil emulsion (see column 4 lines 26 and 27). On the other hand, U.S. Pat. No. 3,946,122 to Scharp provides a plastic food spread which is prepared from an emulsion of fat dispersed in an aqueous phase and in the final product the spread still contains a continuous aqueous phase although part of the aqueous phase may be enclosed in the dispersed fat phase (see column 2, lines 22 to 25).

As in cheese processing, the milk solids in the aqueous phase may be peptised at any temperature above about 65° C. However at this temperature, peptization has been found to be extremely slow, if it occurs at all, and for economical reasons the aqueous phase is preferably heated to a temperature in the range of 80° C. to 110° C. which has the advantage of also pasteurizing or even sterilizing the ingredients. Heating may be, for example, by direct injection of culinary steam. Such steam may be injected direct into a premixing vessel, and the aqueous phase may be recirculated out of and back through the vessel by suitable pump means to ensure thorough dispersion, and the casein or casein derivative is conveniently added during such recirculation. The edible fat content may be added exteriorly of the vessel, through, for example, the pump means, or directly into the vessel.

The sol may be stored prior to mixing with the edible fat in which case, it may be reheated, preferably to a temperature of at least 80° C., immediately prior to mixing with the edible fat. Preferably, however, the edible fat is thoroughly mixed with the prepared sol immediately after preparation so that said mixing may commence at an elevated temperature, for example of at least 80° C.

The edible fat may be natural dairy butter churned from either sweet cream or cultured cream, with or without the addition of salt as NaCl in the final product, and having an approximate analysis of 80% butter fat, 2% curd, 2% salt (as NaCl) and 16% moisture. However, butter fat suitably recombined with dairy solids and/or stabilizers known as "reconstituted butter", may be utilized in the same manner as natural dairy butter, as may butter fat or oil or vegetable oil alone. In particular, emulsions may be prepared from clarified butter oil, soy bean oil and combinations of clarified butter oil and soy bean oil. The preferred edible fat is natural dairy butter or reconstituted butter, but the food product produced by the method of the invention described heretofore using butter is unstable as is described hereinafter.

The proteinaceous milk solids may be casein curd either lactic or acid, precipitated from wholesome skimmed milk or the casein derivatives of such casein, (for example sodium, calcium or potassium caseinates) prepared as a food in a hygienic manner. Alternatively, milk powders such as skim milk, butter milk, etc. comprising sufficient protein may be substituted or used as an admixture. The proteinaceous milk solids may comprise any suitable mixture of the aforementioned products but where they comprise non-precipitated proteins it has been found that they have a distabilizing effect on the water-in-oil emulsion which when removed from the refrigerator quickly displays syneresis. The preferred proteinaceous milk solid is sodium caseinate.

The peptising agent may be selected from one or more of the salts of citric acid (citrates) and the salts of polyphosphoric acid (polyphosphates) or monophosphoric acid (monophosphates) or such other agent as will function in a similar manner to peptise the protein molecules, resulting in the formation of a finely divided colloidal solution or sol in water or other liquid carrier, and also enable the acidity of the compound to be adjusted by their selection. The preferred salt varies in accordance with the acidity of the other components but is substantially a polyphosphate mixed with a proportion of citrates. The advantage of producing a protein sol in this way is that it is then readily miscible with the edible fat.

The aqueous carrier may be clean potable water and/or milk or its by-product such as skimmed milk, and/or butter milk and/or whey. Such milk products may be incorporated in their natural state or recombined from dry powder. The preferred aqueous carrier is water. Where milk products containing non-precipitated proteins are included in the aqueous carrier it has been found that they have the same distabilizing effect as if they were included in the milk solids.

The oil-in-water emulsion resulting from the combination of the fat or oil and the sol remains a soft flowable sticky mass even when kept chilled down to 5° C. for several days. However it is a feature of the present invention that when the oil-in-water emulsion is subjected to depressed temperatures below 5° C., the emulsion inverts to a water-in-oil emulsion which can provide the desired properties of the product. The phase inversion may be extremely slow at a temperature immediately below 5° C. and is several times quicker below 0° C. The preferred temperature range for the phase inversion is minus 4° C. to minus 10° C. The water-in-oil emulsion formed on chilling may be somewhat lacking in texture, mouth feel, colour and taste, and, as mentioned already in the case of whole butter being used as the fat, or in the case of non-precipitated milk solids being included in the sol, is also unstable. Nevertheless, the product may have several valuable applications in this condition including its ability to be readily combined with other food products for example, as a baking additive or as a fat compound readily sprayed onto an edible substrate or spray dried. It is however capable of ongoing processing in several modes.

Where the edible fat comprises vegetable oil, and/or butter fat or oil and only precipitated milk solids are included in the sol the oil-in-water emulsion may be packaged hot under a hermetic seal prior to phase immersion. Such packaged product is cooled to invert the phase and on recovering to ambient temperature, up to 20° C., retains a gel structure which can be soft and spreadable or firm and sliceable according to the proportion of protein in the sol. Such gel structure is retained at refrigeration temperatures. Allowing the water-in-oil emulsion to recover to ambient temperatures has been found to allow the fat to disperse slightly in the emulsion.

When an oil-in-water emulsion derived in accordance with the invention includes non-precipitated protein such as is encountered in butter and butter-milk and is cooled to invert the phase, the water-in-oil emulsion is unstable on being raised in temperature above 5° C. and moisture will quickly separate. However, in accordance with a further aspect of the invention it may be stabilised by adding further effective amounts of peptising agent with or without additional water and homogenously mixing and heating the further mixture to a temperature preferably, but not necessarily, of at least 80° C. both sufficient to complete the peptisation of the proteins in the further mixture, to obtain a further oil-in-water emulsion which at 5° C. is a soft sticky mass but which on cooling to below 5° C. as previously proposed goes through a phase inversion to a water-in-oil emulsion which on rewarming to ambient temperature, unto 20° C., retains a gel structure which can be soft and spreadable or firm and sliceable according to the proportion of protein in the sol. Such gel structure is retained at refrigeration temperatures.

Various embodiment of a method in accordance with the present invention will now be described by way of example only with reference to the accompanying drawing which illustrates essentially in block manner the process stages.

An aqueous phase is prepared in the vessel 1 by adding at 2 a liquid carrier such as water or butter milk, together with phosphate and/or citrate peptising salts and blending by mechanical agitation in vessel 1 and recirculation through conduit 4 and by pump 5 via valve 6 and conduit 7. During the recirculation stage other ingredients including casein or caseinate and other powdered additives are introduced at 8 and the process of combining continued while culinary steam is injected at 3. The agitation and heating are carried out to a temperature and for a time sufficient to complete the action of the peptising salts in finely dividing and peptising the casein and/or casein derivative. Such temperature and time are readily determinable from the cheese processing art. One advantage of the peptising being carried out at a temperature of at least 80° C. is that the resultant sol is pasteurized or, if the temperature is sufficiently high, sterilized.

On completion of the premixing stage, edible fat or oil is introduced directly into the vessel 1 or at 8 into pump 5 to be combined with the sol. The fat or oil is preferably added at approximately 5° C. to cool the sol during the combining process and the fat or oil and sol is mechanically blended into an oil-in-water emulsion. Where the oil-in-water emulsion includes non-precipitated protein, it is directed by valve 6 into a cooler 9 where the emulsion is frozen to −4° C. or below and its phases are inverted by the cooling process to produce a water-in-oil emulsion.

However, this water-in-oil emulsion is unstable due to the non-precipitated protein and to counter this the emulsion is directed from cooler 9 to chamber 10 where following rewarming to about 5° C. it is combined with a further quantity of peptising agent added at 11 which may be of the same or similar nature to those added to the aqueous phase, and the mixture so formed is agitated and heated at 12, preferably to at least 80° C., for a time to fully peptise the protein. Surprisingly, it has been found that this further peptising procedure stabilises not only the curd fraction of any butter which may have been added as the fat, but also any non-precipitated protein added to the aqueous phase which was not stabilised by the initial peptising procedure.

The resultant oil-in-water emulsion may now be packaged hot following path 21 and hermetically sealed at 13 and again cooled to below 5° C. at 14, preferably to −4° C. or below to freeze the product and effect phase inversion. In the case of butter being added to the aqueous phase to produce a cold, spreadable butter it may be found, however, that the resultant water-in-oil emulsion does not have the colour, texture and mouth feel of natural butter of a similar consistency, and this may be produced to a considerable degree by allowing at 15 the packaged emulsion to rise in temperature up to approximately 20° C. or such temperature at which the crystallised butter fat disperses sufficiently to assume the colour and texture in natural butter while being spreadable direct from the refrigerator. The same re-warming procedure may be followed for non-butter products, or butter products which have additional protein content to give them cold firm and sliceable characteristics.

The packaged emulsion is finally stored at refrigeration temperatures and will remain stable for an extended period.

If butter fat or oil or vegetable oil is used as the edible fat, with no non-precipitated protein in the aqueous phase, the emulsion has been found to be stable and it is not necessary for the stabilization steps 9 to 12 to be carried out so that the hot oil-in-water emulsion is transferred direct from the valve 6 to be packaged at 13 as shown by the path 17, and then treated by the previously described steps 14 to 16 to provide a spreadable reduced-fat water-in-oil emulsion which is spreadable or sliceable at refrigeration temperatures.

According to one application of the present invention, a soft spreadable and stable emulsion similar to processed cheese spread may be prepared having an entirely neutral flavour by dispersing 150 gms of polyphosphate emulsifiers in 4.5 kgs of water and incorporating 1 kg of sodium caseinate in any form while heating to 95° C. The aqueous phase so produced is mixed for 3 to 5 mins to ensure peptisation of the protein following which 1.33 kgs of hydrogenated soy oil and 6.67 kgs of clarified butter oil are incorporated under vigorous agitation. The resultant oil-in-water emulsion is cooled and frozen whereupon the phase inverts from o/w to w/o. The water-in-oil emulsion may, if desired to dispense the fat slightly, be rewarmed upto ambient temperature prior to refrigeration. Upon removal from refrigeration the resultant emulsion is stable up to 25°–28° C. and remains plastic and spreadable at 0° to 5° C. Flavouring agents may be added as desired.

According to a second application of the present invention a firm, sliceable and stable emulsion incorporating butter is prepared by dispersing 220 gms of emulsifier comprising sodium citrate in 4.5 kgs water and heating to 75° C., then by adding 1½ kg of calcium caseinate while agitating and heating to 95° C. for 3 mins following which 8 kgs of standard 80% fat dairy butter are added under vigorous agitation thereby effectively cooling the o/w emulsion thus produced to approximately 40° C. Following the incorporation of butter the emulsion is further cooled to freezing (preferably to −4° C. or below) until the phase inverts from o/w to w/o. The emulsion thus prepared is further treated to stabilize it by the addition of a further 200 gms of the same emulsifying system dispersed in water. The emulsion is firstly heated to 20° C. to facilitate incorporation of the emulsifiers and then heated by indirect heat to approximately 85° C., followed by working for several minutes. The resultant oil-in-water emulsion is cooled to freezing again until phase inversion to a water-in-oil emulsion occurs following which the product may be refrigerated and is firm but sliceable at refrigeration temperatures. The bland-flavoured mass is similar in texture to a mass of sliceable processed cheese and may have its flavour enhanced.

A third example of application exemplifies a means of producing a soft spreadable butter identical in taste, mouthfeel and texture to butter but spreadable at 0° to 5° C., accomplished by preparing an aqueous phase of 4.5 kgs water heated to 75° C. and the dispersal therein of 180 gms of a blend of 25% citrate and 75% polyphosphate peptising salts followed by the addition of 1 kg of dehydrated sodium caseinate. The aqueous phase is heated to 95° C. and maintained under agitation for 5 mins. 8 kgs of whole dairy butter are added to the acqueous phase at 5° C., effectively cooling the emulsion to approximately 40° C., under further agitation, the resultant emulsion being of the o/w type. The product of this process is then cooled to below −4° C. to freeze the emulsion which inverts to a w/o phase. The new emulsion is rewarmed by indirect heat to approximately 20° C. and a further amount of 180 gms of similar peptising salts is added as a dispersion in 250 gms of water and then agitated and heated indirectly to 85° C. during which the phase subtly reverts to an o/w type emulsion. The emulsion thus formed is packed and sealed and again frozen to a temperature at which the phase inverts once again to w/o with the butter fat becoming the continuous phase and the aqueous phase being the disperse phase. Such product on warming to an ambient temperature of 20° C. is stable and identical to butter except that repeated removal from a household refrigerator at 5° C. retains a suitable spreadable characteristic immediately.

What is claimed is:

1. A method of producing a food product containing an edible fat which comprises the steps of:
   (a) preparing an aqueous phase comprising proteinaceous milk solids containing precipitated proteins, an aqueous carrier and an amount of peptising agent effective to peptise said precipitated proteins,
   (b) agitating and heating the aqueous phase to a temperature greater than about 65° C. and for a time both effective to complete the action of the peptising agent on the precipitated proteins in the milk solids and thereby produce a sol,
   (c) homogenously mixing with the sol an edible fat to produce an oil-in-water emulsion, and
   (d) cooling the emulsion to a temperature below 5° C. at which phase inversion occurs to a water-in-oil emulsion.

2. A method as claimed in claim 1 wherein following cooling to produce the water-in-oil emulsion, said emulsion is rewarmed to approximately ambient temperature prior to storage at refrigeration temperatures.

3. A method as claimed in claim 1 wherein the water-inoil emulsion contains non-precipitated protein and the emulsion is stabilised by:
   (a) rewarming the emulsion and adding a further amount of peptising agent effective to peptise said non-precipitated protein,
   (b) agitating and heating the resultant further mixture to a temperature greater than about 65° C. and for a time both effective to complete the action of the further peptising agent on the non-precipitated protein to provide a further oil-in-water emulsion, and
   (c) cooling the further oil-in-water emulsion to a temperature below 5° C. at which phase inversion occurs to a further water-in-oil emulsion.

4. A method as claimed in claim 3 wherein following cooling to produce the further water-in-oil emulsion, said emulsion is rewarmed to approximately ambient temperature prior to storage at refrigeration temperatures.

* * * * *